US005604678A

United States Patent [19]
Neuenschwander

[11] Patent Number: 5,604,678
[45] Date of Patent: *Feb. 18, 1997

[54] CONTROLLER FOR A PROGRESSIVE DIE ASSEMBLY FOR THE MANUFACTURE OF LIMITED PARTS

[75] Inventor: Thomas R. Neuenschwander, Fort Wayne, Ind.

[73] Assignee: L.H. Carbide Corporation, Fort Wayne, Ind.

[*] Notice: The portion of the term of this patent subsequent to Apr. 5, 2013, has been disclaimed.

[21] Appl. No.: 279,787

[22] Filed: Jul. 25, 1994

Related U.S. Application Data

[60] Continuation of Ser. No. 43,002, Apr. 5, 1993, Pat. No. 5,377,115, which is a division of Ser. No. 874,860, Apr. 28, 1992, Pat. No. 5,373,622, which is a division of Ser. No. 724,866, Jul. 2, 1991, Pat. No. 5,123,155, which is a continuation of Ser. No. 171,555, Mar. 22, 1988, Pat. No. 5,087,849, which is a continuation of Ser. No. 853,207, Apr. 17, 1986, Pat. No. 4,738,020, which is a division of Ser. No. 478,692, Mar. 25, 1983, Pat. No. 4,619,028.

[51] Int. Cl.$^6$ ...................................................... G06F 19/00
[52] U.S. Cl. ............................ 364/476.01; 29/596; 29/714
[58] Field of Search ...................................... 364/468, 472, 364/476; 310/51, 216, 217, 261, 42; 29/596, 598, 714, 33 Q

[56] References Cited

U.S. PATENT DOCUMENTS

| 2,562,254 | 7/1951 | Andrus | 171/252 |
|---|---|---|---|
| 3,110,831 | 11/1963 | Zimmerle | 310/217 |
| 3,202,851 | 8/1965 | Zimmerle | 310/259 |
| 3,203,077 | 8/1965 | Zimmerle | 29/155.5 |

(List continued on next page.)

FOREIGN PATENT DOCUMENTS

| 0042046 | 12/1981 | European Pat. Off. . |
|---|---|---|
| 2017379 | 10/1971 | Germany . |
| 2631188 | 1/1978 | Germany . |
| 2751123 | 5/1979 | Germany . |
| 2815727 | 10/1979 | Germany . |
| 52-156305 | 12/1977 | Japan . |
| 55-109524 | 8/1980 | Japan . |
| 55-128484 | 9/1980 | Japan . |
| 56-91656 | 7/1981 | Japan . |

(List continued on next page.)

OTHER PUBLICATIONS

Computer Numerical Control of Production of Rotor and Stator Lamination Segments for Large Electrical Generators and Motors, Arthur C. Silverton, Metalworking '82.
Die Design Handbook, Second Edition, McGraw Hill, pp. 9–11, 11–21, 16–15.

Primary Examiner—Roy N. Envall, Jr.
Assistant Examiner—Steven R. Gorland
Attorney, Agent, or Firm—Baker & Daniels

[57] ABSTRACT

Elongated thin strip stock is blanked to form interlocking laminas for electric motor or generator rotors or stators at successive blanking stations. At a final assembly station the laminas are stacked and pressed into interlocking relationship. In response to an operator input a predetermined number of reversals, or half turns about the stack axis of the previously stacked lamina are provided in order to compensate for nonuniform strip thickness to obtain a rotor or stator of substantially uniform height. Alternatively the thickness of the strip stock is gauged at transversely spaced points on the strip to determine cross feed thickness variation in the strip whereupon the stacked laminas are automatically provided with a number of reversals about the stack axis in response to a thickness differential that would result in a parallelism error in the stack that exceeds a predetermined amount. Rotor conductor slots are formed in the stacked laminas and are skewed to the stack axis by providing arcuate indexing of each lamina relative to the next preceding lamina in the stack by an arcuate increment that is automatically determined in response to operator entered inputs relative to the stack height, the skew angle, nominal lamina thickness and skew direction.

22 Claims, 6 Drawing Sheets

U.S. PATENT DOCUMENTS

| | | | |
|---|---|---|---|
| 3,457,445 | 7/1969 | Dochterman | 310/190 |
| 3,581,389 | 6/1971 | Mori et al. | 29/598 |
| 3,590,208 | 6/1971 | Martini | 219/92 |
| 3,652,889 | 3/1972 | Reece et al. | 310/259 |
| 3,802,068 | 4/1974 | Scott | 29/598 |
| 3,823,460 | 7/1974 | Bergman | 29/203 |
| 4,110,895 | 9/1978 | Mitsui | 29/736 |
| 4,160,182 | 7/1979 | Mitsui | 310/214 |
| 4,162,734 | 7/1979 | Dangelmeier | 414/27 |
| 4,204,314 | 5/1980 | Workman | 29/59 |
| 4,272,579 | 6/1981 | Mitsui | 428/133 |
| 4,383,356 | 5/1983 | Fichtner | 29/598 |
| 4,445,272 | 5/1984 | Bruhn et al. | 29/598 |
| 4,457,664 | 7/1984 | Judell et al. | 414/757 |
| 4,524,507 | 6/1985 | Hara et al. | 29/564.2 |
| 4,619,028 | 10/1986 | Neuenschwander | 29/33 |
| 4,738,020 | 4/1988 | Neuenschwander | 29/598 |
| 5,087,849 | 2/1992 | Neuenschwander | 310/216 |
| 5,123,155 | 6/1992 | Neuenschwander | 29/596 |

FOREIGN PATENT DOCUMENTS

| | | |
|---|---|---|
| 56-107764 | 8/1981 | Japan . |
| 56-129556 | 10/1981 | Japan . |
| 56-129557 | 10/1981 | Japan . |
| 57-26424 | 2/1982 | Japan . |
| 57-25138 | 2/1982 | Japan . |
| 57-88858 | 6/1982 | Japan . |
| 907708 | 2/1982 | U.S.S.R. . |

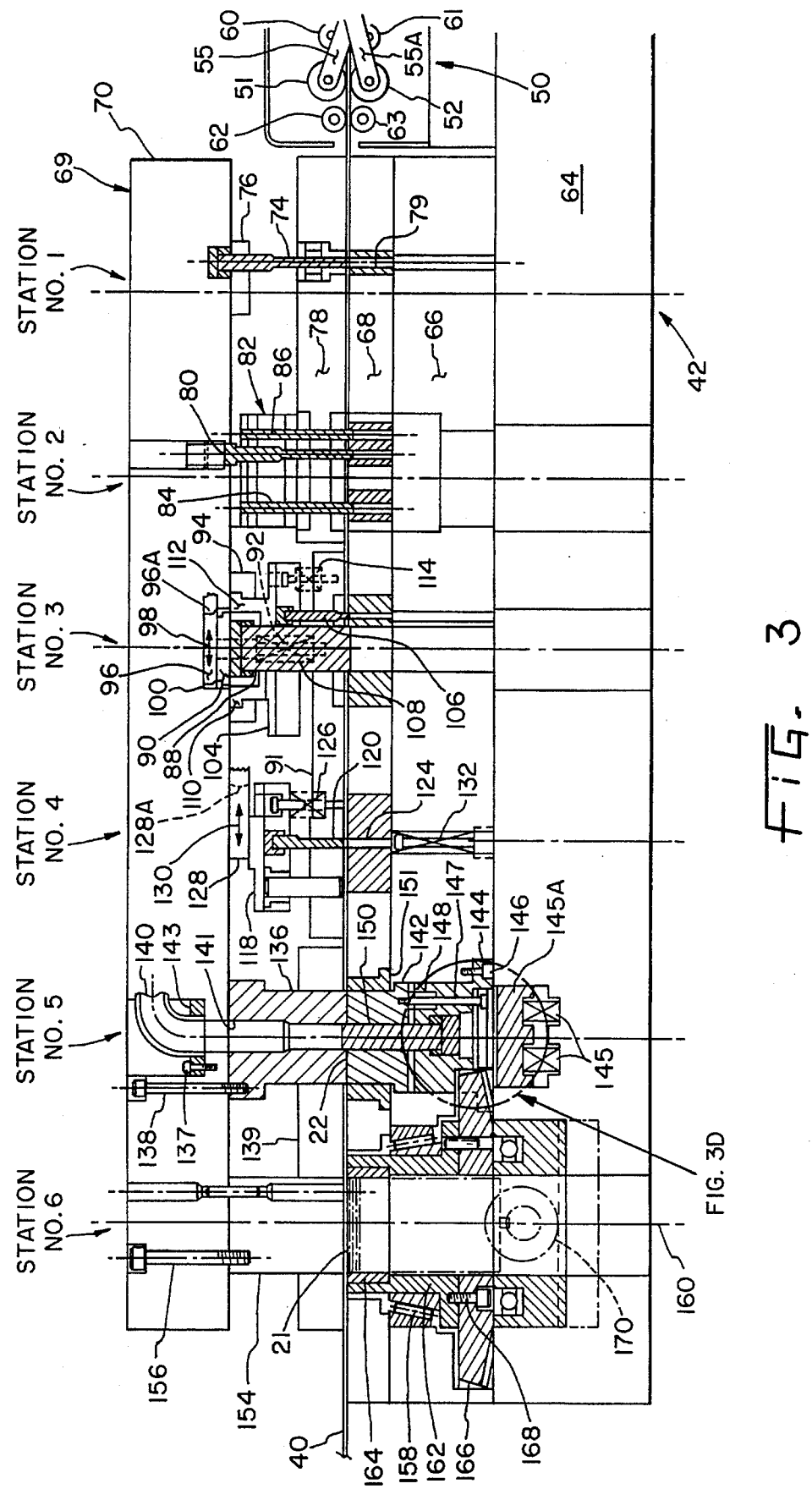

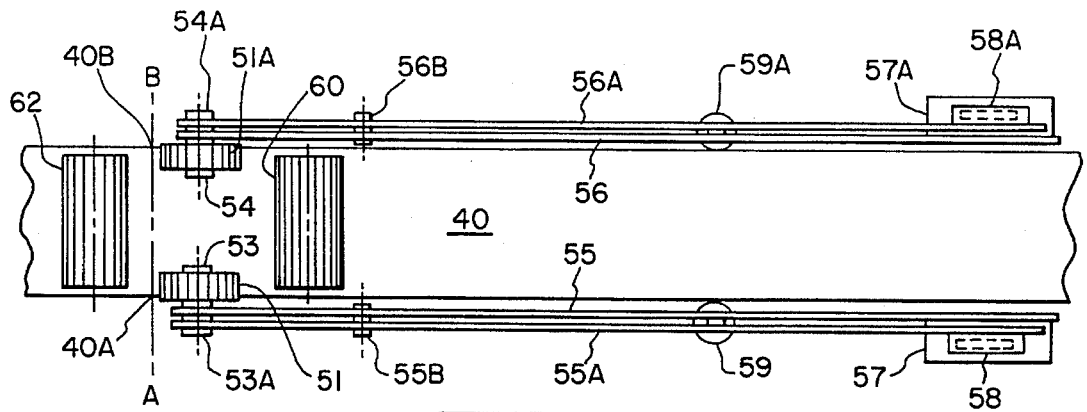
FIG. 3B
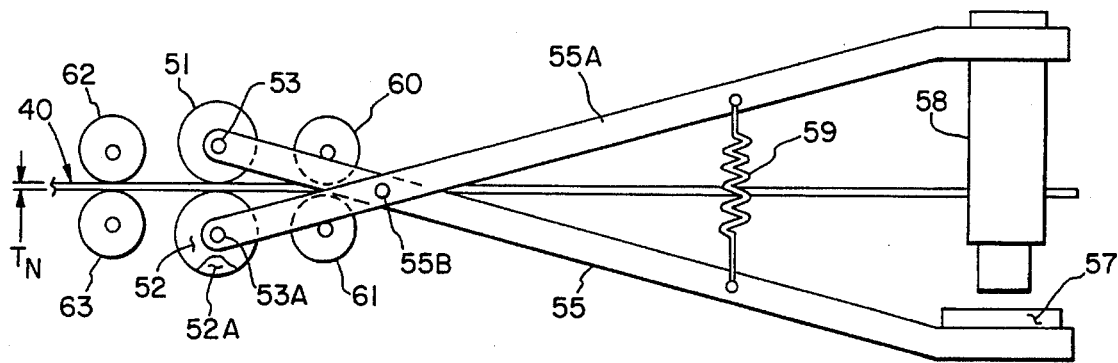
FIG. 3A
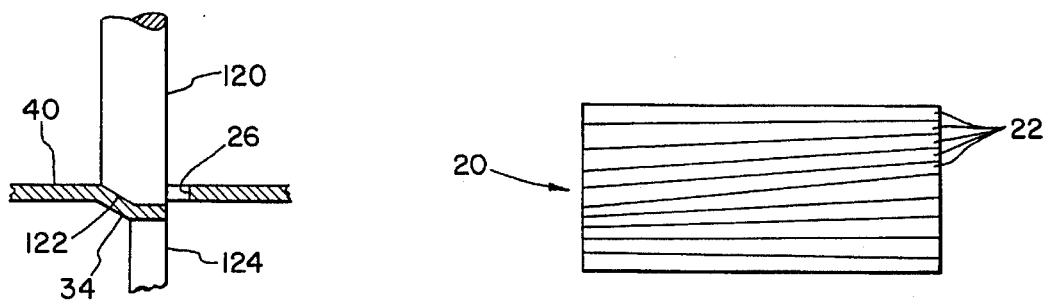
FIG. 3C
FIG. 6C

CONTROLLER FOR A PROGRESSIVE DIE ASSEMBLY FOR THE MANUFACTURE OF LIMITED PARTS

This is a continuation application of my application Ser. No. 08/043,002, filed Apr. 5, 1993, now U.S. Pat. No. 5,377,115, entitled "CONTROLLER FOR A PROGRESSIVE DIE ASSEMBLY FOR THE MANUFACTURE OF LAMINATED PARTS", which is a divisional application of my patent application Ser. No. 07/874,860, filed Apr. 28, 1992, now U.S. Pat. No. 5,373,622, entitled "APPARATUS AND METHOD FOR MANUFACTURING LAMINATED PARTS", which is a divisional application of my patent application Ser. No. 07/724,866, filed Jul. 2, 1991, now U.S. Pat. No. 5,123,155, entitled "APPARATUS AND METHOD FOR MANUFACTURING LAMINATED PARTS", which is a continuation of my patent application Ser. No. 07/171,555, filed Mar. 22, 1988, now U.S. Pat. No. 5,087,849, entitled "LAMINATED PARTS AND A METHOD FOR MANUFACTURE THEREOF", which is a continuation of my patent application Ser. No. 06/853,207, filed Apr. 17, 1986, now U.S. Pat. No. 4,738,020, entitled "METHOD FOR MANUFACTURE OF LAMINATED PARTS", which in turn is a divisional application of my patent application Ser. No. 06/478,692, filed Mar. 25, 1983, now U.S. Pat. No. 4,619,028, entitled "APPARATUS FOR MANUFACTURE OF LAMINATED PARTS".

This Invention is in the field of laminated parts and their manufacture and more particularly electric motor or generator rotors and stators having stacked laminas and their manufacture.

Rotor and stator manufacture employing stacked laminas is well known in the art. Typically, the laminas are blanked from continuous strip stock and then stacked and bound together to form the rotor or stator. However, due to manufacturing tolerance thickness variations of the strip stock the rotor or stator could have a parallelism error, i.e. be out of conformance from a true right cylinder, thereby limiting close tolerance assembly of a rotor and a stator and operation thereof. This parallelism error occurs because in stacking the laminas the thicker portions of the laminas are directly overlying resulting in one side of the stack being higher than the opposite stack side causing a leaning or bending of the stack.

Also, in laminated rotor or stator manufacture a plurality of conductor slots are formed around the periphery of the rotor or stator stack in arcuately spaced relation to one another. If it is desired to skew the slot axes relative to the stack axis, it is common practice to index each lamina an arcuate increment relative to the next preceding lamina so that in a stack the axis of each slot is skewed or slanted relative to the stack axis. The amount of indexing has been achieved by manually operated clamps after the stack has been formed and by a manually adjustable stop which controls the degree of arcuate travel in each rotational increment. Other prior art systems are evidenced by the statements made in documents cited in the prosecution of this application, Due to the inexactness of the above described manual adjustments, skew inaccuracies and/or excessive adjustment time resulted. Other prior art systems are evidenced by the statements made and documents cited in the prosecution of the aforementioned U.S. Patent and copending application from which this application is a continuation.

SUMMARY OF THE INVENTION

In a laminating press, laminas are blanked from elongated strip stock for electric motor parts such as rotors or stators. The laminas are stacked or overlaid to form a lamina stack. One of more stack reversals, i.e. half turn rotations about the stack axis, are preformed just prior to stacking the next lamina. The number of reversals in each stack may be selected and entered by the operator prior to press operation based on known or experienced thickness variations in the strip stock. The method of this invention will then automatically provide the entered number of stack reversals at determined vertically spaced places in the stack height. Alternatively, the particular reversals may be automatically selected by measuring the cross-feed or cross-grain differential thickness of the strip stock. Cross-feed differential thickness is defined as the thickness differential between at least two points along a transverse line substantially perpendicular to the longitudinal feed direction of the strip stock. When the cross-feed thickness differential at a longitudinal portion on the strip stock is excessive, as determined from certain later explained parameters, a number of compensating stack reversals are automatically determined. In this manner, compensation is provided for nonuniform strip stock thickness.

To accurately obtain a predetermined skew angle of conductor slots in the rotor lamina stack, the operator enters the stack height, the desired skew angle, skew direction and nominal lamina thickness. The skew direction is + (plus) or − (minus) depending whether the skew angle is clockwise or counterclockwise from the stack axis, respectively. The nominal lamina thickness is the average thickness of the strip stock. This invention provides for accurately indexing each lamina an arcuate increment relative the next previous lamina prior to stacking to accurately obtain the desired skew angle.

The above mentioned half turn and indexing are achieved by a servomotor gear drive of a choke die which holds the stacked laminas. The instantaneous or actual rotational position of the die is compared with the desired rotational position of the die as determined by this invention. An error signal corresponding to the differential of the actual and desired rotational positions is used to drive the servomotor to achieve the desired rotational position of the die prior to stacking the next lamina.

It therefore is an object of this invention to provide a system for compensating for nonuniform thickness of strip stock from which stacked lamina electric motor or generator parts are fabricated.

It is an object of this invention to provide in the system of the previous object stack reversals about the stack axis, the number of reversals being operator entered prior to the stacking or automatically determined in response to measured cross-feed thickness of the strip stock.

It is a further object of this invention to index each lamina in a laminated stack of an electric motor or generator part having skewed conductor slots in response to operator entered inputs of stack height, a skew angle and nominal lamina thickness to accurately obtain a desired conductor slot skew angle.

Another object is to provide laminated parts manufactured according to the aforestated objects.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 3 is a simplified, partially broken away, vertical section of a die assembly for producing the core of FIG. 2;

FIG. 3A is a simplified, partially broken away, diagrammatic elevational view of the gauge that is partially shown in FIG. 3;

FIG. 3B is a simplified, partially broken away, diagrammatic plan view of the gauge of FIG. 3A;

FIG. 3C is an enlarged partial elevational view of the lower end area of a punch pin at Station No. 4 in FIG. 3;

FIG. 6C is a view similar to the view of FIG. 6B showing another core stack of this invention;

Figure 1:
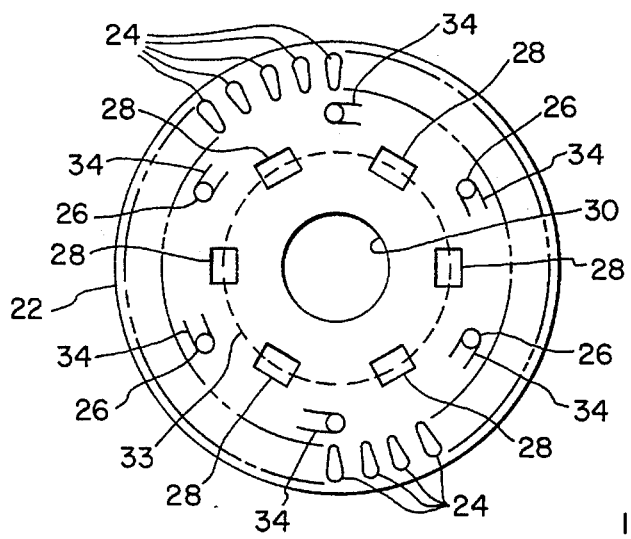
FIG. 1 is an enlarged plan view of a rotor core.

Corresponding reference characters indicate corresponding parts throughout the several views. The exemplifications set out herein illustrates a preferred embodiment of the invention, in one form thereof, and such exemplifications are not to be construed as limiting the scope of the invention in any manner.

DESCRIPTION OF THE PREFERRED EMBODIMENT

Figure 2:
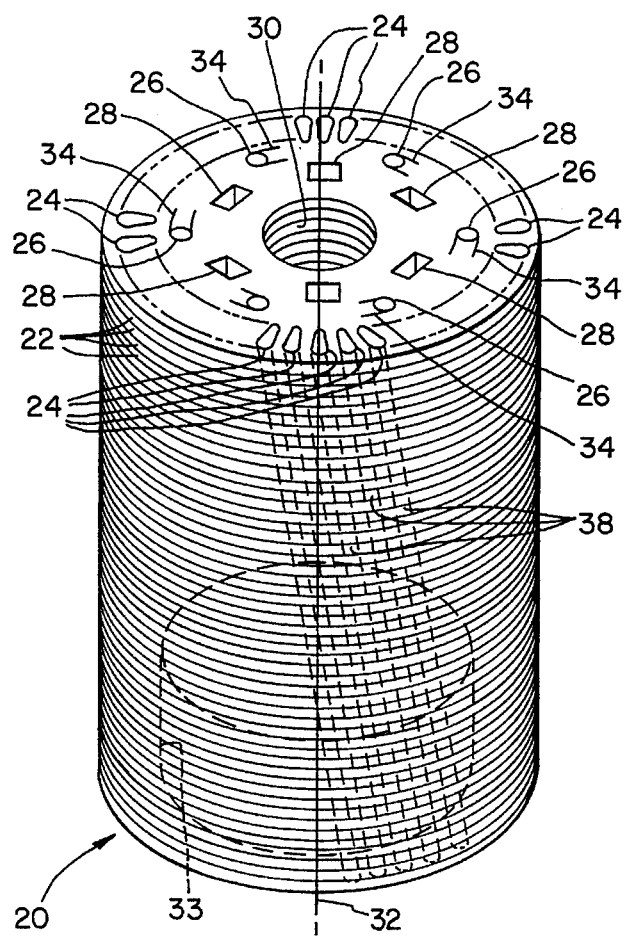
FIG. 2 is a perspective view of a FIG. 1 rotor core.

Referring to FIGS. 1 and 2 a laminated rotor core 20 formed of a plurality of laminas 22 is shown. Each lamina 22 has a plurality of teardrop shaped slot openings 24 spaced about and adjacent its perimeter; a plurality of skew control holes 26 arcuately spaced about a circular arc that is spaced inwardly from the lamina perimeter; a plurality of oblong vent openings 28 arcuately spaced about a circular arc that is spaced further inwardly from the perimeter; and a central shaft hole 30 having central axis 32. A counterbore 33 is formed in the lower end of core 20. Each lamina 22 excepting the bottom lamina in a core 20 has arcuate interlock tabs 34 depressed from the lamina lower surface to engage a corresponding tab 34 and hole 26 in the next lower lamina 22 to interlock the two laminas in a manner well known in the art. The bottom lamina 22, or first lamina, in the core 20 stack has the interlock tab 34 areas blanked and removed since, as will become apparent, it is not desired to interlock the bottom lamina 22 to the lamina next below it, which is the top lamina in the preceding core, in order that the cores are separate from one another.

Each lamina 22 is arcuately displaced about axis 32 from the lamina next below it before the two laminas are interlocked in a manner such that slots 38 are formed by openings 24 so that each of the slot 38 axes is provided with a desired skew angle to axix 32 for purposes well known in the art. Typically, slots 38 are filled with a molten electrically conductive metal such as aluminum and are connected at their ends in a manner to provide rotor core conductor bars, as is well known in the art. The skew angle may be left handed or right handed depending on whether the slot 38 axes cross axis 32 from left to right or right to left as one moves downwardly down the slot axes.

Figure 4:
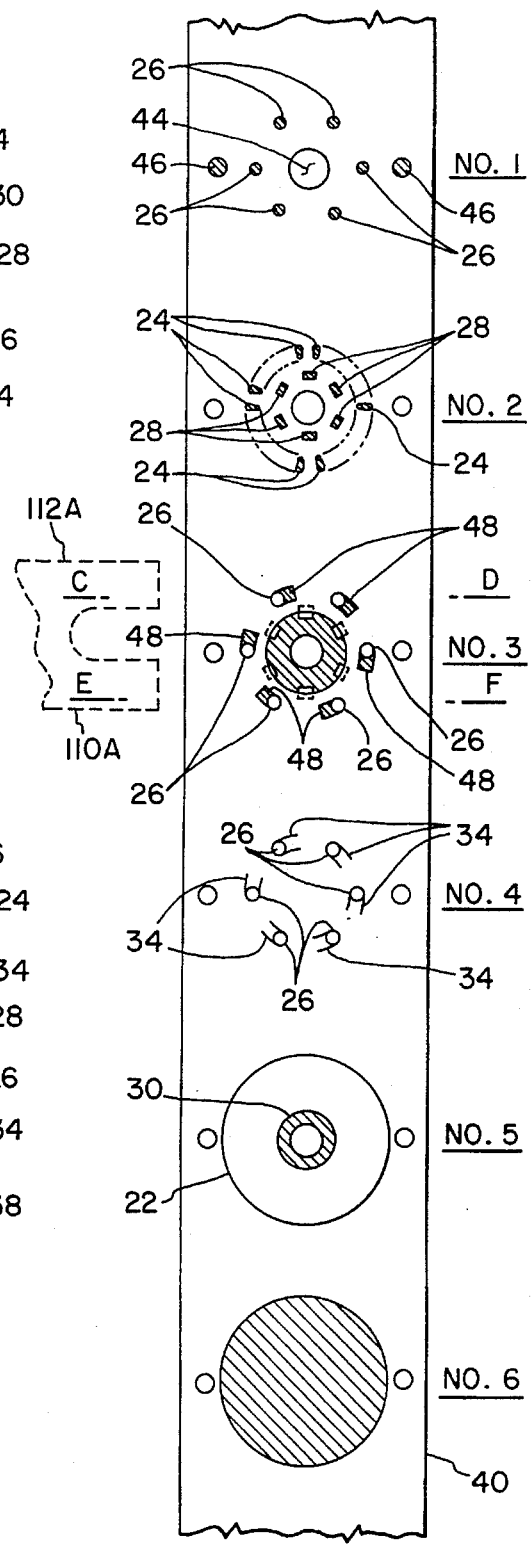
FIG. 4 is a plan view of the strip stock used in the die assembly of FIG. 3 showing the blanking operations performed at each station in the press of FIG. 3 with hatch shading showing the openings blanked at each station to distinguish the openings blanked at previous stations.
Figures 6A, 6B:
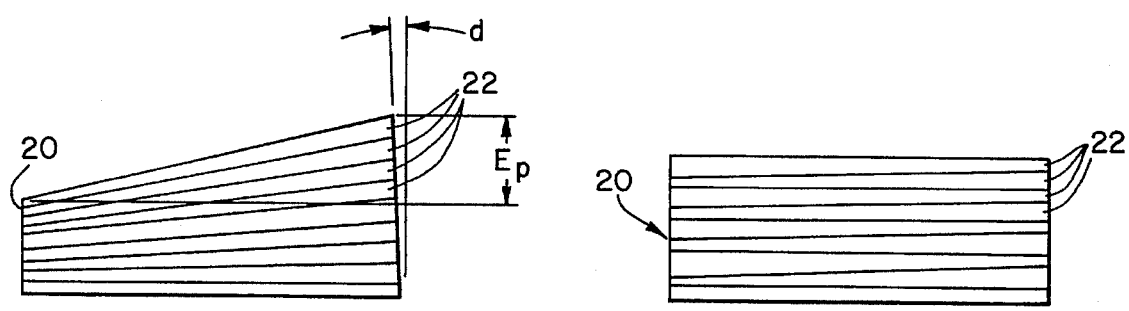
FIG. 6A is an exaggerated enlarged fragmentary elevational view of a conventional core stack.
FIG. 6B is a view similar to the view of FIG. 6A showing a core stack of this invention.

Referring to FIGS. 6A and 6B an important function performed by this invention will be described. When laminas 22 are blanked from a strip 40, FIG. 4, that has nonuniform thickness in the cross feed or cross grain direction, a core 20, FIG. 6A, could result. As used herein, cross feed or cross grain is a direction along a line that is perpendicular to the feed direction or length of strip 40, such as line A–B in FIG. 3B and nonuniform thickness refers to the condition wherein one edge 40A of strip 40 is thicker than the opposite edge 40B in the cross feed direction and is frequently present in available metal strip stock. Core 20 has an error "d" which is a deviation from a true right cylinder and results from the thicker edges of laminas 22 being vertically superposed one upon another and a parallelism error $E_p$ which is the difference in heights of diametrically opposite sides of core 20 and is referred to herein to define the maximum permissible core 20 error that is permissible for a given application. By providing a selected number of stack rotations, or reversals, of 180°, each reversal prior to interlocking the next lamina on the stack, the thicker edges may be alternated with the thinner edges to provide a true right cylinder, FIG. 6B, and thus correct the error $E_p$. In practice, it is often necessary to half turn or reverse only once, FIG. 6C, in an entire core 20 to provide a core stack with an acceptable parallelism error. In this invention the number of reversals may be preset and entered by the operator prior to core manufacture or automatically determined by actual measured thickness variations of opposite edges of the strip 40 during manufacture.

Referring now to FIGS. 3, 3A, 3B, 3C, and 4, a blanking and core forming assembly 42 for the progressive blanking of an elongated stock strip 40 to form laminas 22 and core 20 will be described. The blanked or formed portions of strip 40 at each of the following described stations is shown with a cross hatch shading to distinguish over those portions blanked at previous stations. Briefly, at Station No. 1, holes 26, shaft pilot hole 44 and pilot holes 46 are blanked. At Station No. 2, thirty four slot openings 24 and six vent openings 28 are blanked. At Station No. 3, a cluster of punch pins blank six interlock tab openings 48 for the first, or bottom, lamina 22 only in a core 20 and a counterbore punch blanks a counterbore opening 49 in a specified number of laminas 22 to form counterbore opening 33. At Station No. 4 arcuate interlock tabs 34 are lanced from strip 40 and then depressed below the lower strip surface, a tab 34 being adjacent each hole 26 and having its depressed end immediately below the edge of the corresponding hole 26, FIG. 3. At Station No. 5 a lamina 22 is blanked from strip 40, and shaft hole 30 is simultaneously blanked, after which lamina 22 is pushed back into the plane of strip 40. At Station No. 6, a lamina 22 is pushed through strip 40 and into a choke ring die barrel which is rotated an angular increment to obtain the desired skew angle and direction of the axes of slots 38 and is rotated an additional 180° or half turn to compensate for thickness nonuniformity of strip 40.

Strip 40 is fed from a supply coil or other supply, not show, and enters thickness gauge 50. Briefly described with reference to FIGS. 3, 3A, and 3B, gauge 50 has vertically spaced carbide rollers 51, 52 rotatable on precision ball bearings about horizontal, transverse axles 53A, 53B respectively, above and below strip 40, respectively. Rollers 51, 52 contact the upper and lower surfaces respectively of strip 40 at edge 40A adjacent cross-feed line A–B. In similar manner, vertically spaced carbide rollers 51A, 52A are rotatable on precision ball bearings about axles 54, 54A respectively, above and below strip 40, respectively and contact the upper and lower surfaces of strip 40 at edge 40B adjacent line A–B. Axles 53, 53A are affixed to one end of elongated outboard arms 55, 55A respectively, each of which is pivoted intermediately of its length to fixed pivot 55B. The opposite ends of arms 55, 55A are fixed respectively to aluminum target plate 57 and sensor 58. A tension spring 59 is coupled at its opposite ends to arms 55, 55A respectively to bias arms 55, 55A towards one another, maintaining contact between rollers 51, 52 and their respective surfaces of strip 40. Other arm biasing means may be used and spring 59 is diagrammatic. The lengths of arms 55, 55A between their respective rollers 51, 52 and pivot 55B are a fraction, e.g. one third, of their lengths between pivot 55B and target plate 57, sensor 58, respectively, in order to provide a mechanical advantage and magnify the relative movement between rollers 51, 52, which is imparted by and a measure of the thickness of strip 40 at edge 40A and increase sensitivity of the measurement. Sensor 58 is of the type that can accurately measure the distance between its lower end and target plate 57. In similar manner, axles 54, 54A are affixed to one end of elongated outboard arms 56, 56A respectively, each of which is pivoted intermediately of its length to fixed pivot 56B. The opposite ends of arms 56, 56A are pivoted respectively to aluminum forget plate 57A and sensor 58A, mounted for sliding vertical movement, respectively. A tension spring 59A is coupled at its opposite ends to arms 56, 56A respectively to bias the arms towards one another, maintaining contact between rollers 51A, 52A and their respective surfaces of strip 40. Other arm biasing means may be used and spring 59A is diagrammatic. The lengths of arms 56, 56A between their respective rollers 51A, 52A and pivot 56B are a fraction, e.g. one third, of their lengths between pivot 56B and target plate 57A, sensor 58A, respectively, in order to magnify the relative movement between rollers 51A, 52A, which is imparted by and a measure of the thickness of strip 40 at edge 40B to increase sensitivity of the measurement. Sensor 58A is of the type that can accurately measure the distance between its lower end and target plate 57A and provides strip 40 thickness measurements at each of edges 40A, 40B and also a thickness differential between edges 40A and 40B. Sensors 58, 58A are commercially available from Kaman Instrumentation, P.O. Box 7463, Colorado Springs, Colo. 80933, their KD-4000 Series.

Damping rollers 60, 61 are placed above and below respectively and in pressure contact with strip 40 before the carbide sensing rollers and damping rollers 62, 63 are placed above and below respectively and in pressure contact with strip 40 after the carbide sensing rollers to damp any vibration of strip 40 so that accurate thickness measurements are facilitated. The signals from each sensor 58, 58A are read and averaged in gauge 50 providing an analog "front" and "back" reading for the front edge 40A and the back edge 40B respectively. The two averages are then averaged in gauge 50 or controller 190, FIG. 5, later described, by an additional averaging unit to provide an average strip 40 thickness. Sensors 58, 58A, may be contacting with rollers as shown, non-contacting, and electronic or air. In practice, it is preferable to clean strip 40 prior to gauging in any suitable manner known to the art and to use air jets on strip 40 immediately prior to strip 40 contact by the sensing rollers to insure accurate measurements.

Gauge 50 is superposed and securely mounted on elongated bolster 64 which extends longitudinally the length of assembly 42. Gauge 50 may also be placed elsewhere, e.g. between the strip 40 coil supply and assembly 42 since the thickness variations of strip 40 are sufficiently gradual that the measurement may be taken relatively close to assembly 42 although not immediately before Station No. 1 as shown. Elongated die shoe 66 is superposed and securely mounted to bolster 64 and extends longitudinally between gauge 50 and the opposite longitudinal end of bolster 64. Elongated die retainer 68 is superposed and securely attached to die shoe 66 and extends longitudinally the length thereof. Elongated punch assembly 69 having elongated upper shoe 70 is superposed retainer 68 and is mounted for reciprocal vertical movement and is operated in a press, not shown, for use with assembly 42 and is commercially available, one source being Minster Machine Company, Minster, Ohio 45865, Model P2 series, or equivalent, which includes a feed mechanism for strip 40 and punch press control 72, FIG. 5, later described, The press also includes a powered ram, not shown, controlled by punch press control 72, to operate shoe 70 downwardly to blank strip 40 at each of Station Nos. 1–6.

At Station No. 1, a cluster of elongated vertical punch pins are mounted in and depend from shoe 70, pin 74 being shown, for blanking openings 26. The cluster is secured to shoe 70 by depending set block 76, in a manner known in the art. The lower end of each pin in the cluster, and the other depending pins and punches to be described at Station Nos. 2–6, in the raised position of shoe 70 are above strip 40 and provide clearance for the progressive longitudinal movement of strip 40 through the stations of assembly 42. Pin 74, and the other Station No. 1 cluster pins, are received for longitudinal movement in close fitting openings in spring stripper 78 which depends from shoe 70 and is positioned immediately above strip 40, extends longitudinally of Station Nos. 1 and 2, and is mounted in conventional manner for stripping of strip 40 from pins of the cluster. In the punching stroke of shoe 70 the lower end of pin 74 and the other cluster pins punch or blank openings 26 in strip 40.

At Station No. 2, a pin cluster is mounted in and depends from shoe 70 for blanking vent openings 28, pin 80 being shown, in conventional manner, the pins extending through corresponding close fitting openings in set block assembly 82 which depends from and is secured to shoe 70. Assembly 82 carries a pin cluster of vertical and depending pins for blanking slot openings 24, pins 84, 86 being shown. The vent and slot opening pins, including pins 80, 84, 86, are received for vertical sliding movement in stripper 78 and extend into corresponding close fitting openings in a die retainer 68 during the punching stroke of shoe 70.

At Station No. 3, depending counter bore punch 88 is carried in carriage 90 which is mounted for reciprocal movement in bridge stripper 91. Carriage 90 is spring urged upwardly by a pair of compression springs 92 which act between carriage 90 and stripper 91 which is supported immediately above strip 40 in conventional manner and extends longitudinally of Station Nos. 4 and 5. Solenoid plate 96, shown in solid lines in its forward position, is mounted in shoe 70 for reciprocal movement longitudinally of shoe 70 as shown by double headed arrow 98 and is actuated by a solenoid, not shown. The retracted position of solenoid plate 96 is shown by the dashed line 96a. Plate 96 in its forward position displaces carriage 90 downwardly relative to shoe 70 against the force of spring 92 and in this position punch 88 will blank out a counterbore opening 49 in strip 40 when shoe 70 is in a punching stroke. When plate 96 is in position 96a, carriage 90 is spring urged upwardly relative to shoe 70 and in this position punch 88 will not blank out a counterbore opening 49 in strip 40 on a punching stroke of shoe 70. Thus, by controlling the position of plate 96, an opening 49 can be selectively made in strip 40.

Carriage 104 carries a cluster of elongated vertically depending interlock tab blank punch pins, pin 106 being shown. Carriage 104 has center bore 108 which slidingly clears punch 88 and carriage 104 is spring urged to an upward position relative shoe 70 by a plurality of compression springs acting between carriage 104 and stripper 91, spring 114 being shown. A pair of solenoid arms 110, 112 are mounted in housing 94, which securely depends from shoe 70, to move transversely along lines CD, EF (FIG. 4) respectively, which lines are perpendicular to the line of feed of strip 40 and are actuated simultaneously by a solenoid mechanism not shown. When arms 110, 112 are in their extended position as shown in solid lines, they are between shoe 70 and carriage 104 displacing carriage 104 downwardly against the force of springs 114 in which position pins 106 are caused to blank interlock tab openings 48 from strip 40. When arms 110, 112 are retracted to the dashed line positions 110A, 112A, respectively, they are clear of carriage 104 and it is spring urged upwardly so that when shoe 70 is in a punching stroke, interlock tabs 48 are not blanked from strip 40. Thus, by position control of arms 110, 112 openings 48 can be selectively blanked from strip 40.

At Station No. 4, carriage 118 carries a cluster of vertically depending elongated pins, pin 120 being shown, for lancing and forming interlock tabs 34. The lower end of pin 120, and the other carriage 118 cluster pins, has a bevel 122, FIG. 3C, which imparts a corresponding bevel to each depressed tab 34. Mounted for reciprocal sliding movement in openings in die shoe 66 and die retainer 68 beneath each carriage 118 cluster pin, such as pin 120, is an elongated vertical upwardly spring loaded supporting pin 124 against which tab 34 is formed to limit its depressed distance to one lamina thickness and prevent tab inclination. A spring 132 is mounted in die shoe 66 to provide the spring loading for each pin 124. Solenoid plate 128, shown in solid lines in its forward position, is mounted just beneath shoe 70 for reciprocal movement longitudinally of shoe 70 as shown by double headed arrow 130 and is actuated by a solenoid, not shown. The retracted position of plate 128 is shown by dashed line 128A. Plate 128 in its forward position displaces carriage 118 downwardly relative to shoe 70 against the force of a plurality of compression springs mounted between stripper 91 and the lower surface of carriage 118, spring 126 being shown. In this position each pin 120 will lance and form a tab 34 when shoe 70 is in its punching position. When plate 128 is in position 128A, carriage 118 moves upwardly under the force of spring 126 and the other springs not shown and pins 120 will not lance and form a tab 34 on a punching stroke of shoe 70. Thus by controlling the position of plate 128, tabs 34 can be selectively lanced and formed. All laminas 22 except the bottom lamina in core 20 have tabs 34 lanced and formed therein. It is understood that when it is desired to change the direction of the axes of slots 38 from right hand to left hand, a different cluster of pins 106 and 120 will be used to change the direction of tab blank 48 and tabs 34 from counterclockwise to clockwise from their respective holes 26.

Figure 3D:
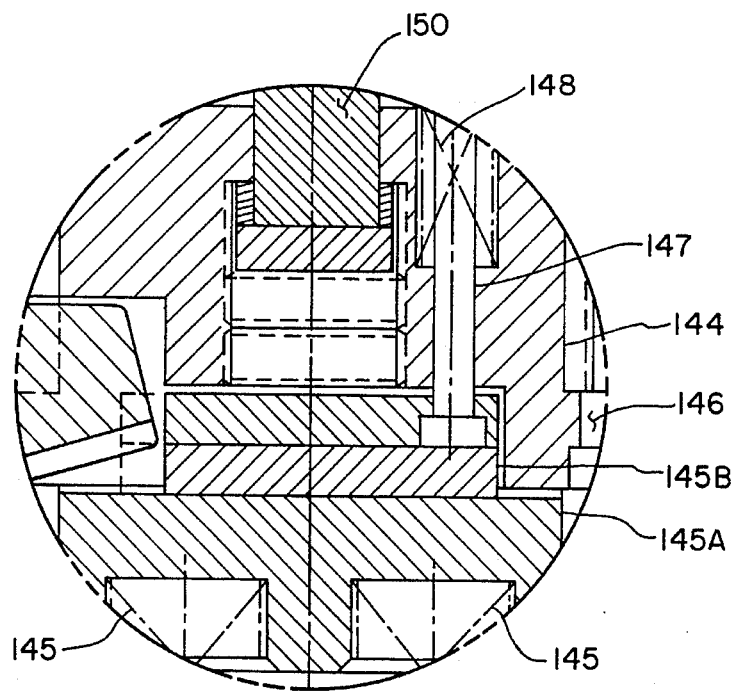
FIG. 3D is an enlarged view of the circled area in FIG. 3.

At Station No. 5, laminas 22 are punched from strip 40 and shaft holes 30 are simultaneously blanked and the slugs removed though chute 140, after which the laminas 22 are returned to the plane of strip 40. Cylindrical punch 136 is securely mounted in depending position from the lower surface of shoe 70 as by bolts, bolt 138 being shown, and is vertically slidably movable in an opening in spring stripper 139 which depends from shoe 70 in conventional manner and is supported immediately above strip 40. Stripper 139 extends longitudinally of Station Nos. 5 and 6. Punch 136 has an opening 141 for passing blanked slugs to chute 140 which is supported by flange 143 which is bolted to shoe 70 as by bolts 143A. Chute 140 is shown 90° out of position in FIG. 3 for illustrative purposes. A cylindrical push back ring 142 is slidably mounted for vertical movement in an opening in die ring 151 and is upwardly biased by a plurality of compression springs, spring 148 being shown, vertically slidably mounted in cylindrical block 144 which is secured in die shoe 66 by bolts, bolt 146 being shown. A plurality of heavy compression springs 145 are mounted in bolster 64 and urge spring block 145A, mounted for vertical reciprocal movement in an opening in bolster 64, upwardly in the opening in bolster 64. Plate assembly 145B, FIG. 3D, is mounted for vertical reciprocal movement in an opening in die shoe 66 and is flush with and abuts the upper surface of block 145A and houses the heads of a plurality of bolts, bolt 147 shown. Bolts 147 extend through respective springs 148 and are in threaded engagement with ring 142 so that ring 142 is spring urged upwardly. Flanged die ring 151 is set in retainer 68 and limits the upward movement of ring 142. Also mounted in block 144 is elongated vertical center shaft hole punch 150 which registers with opening 141. As shoe 70 descends in a punching stroke, a lamina 22 is blanked from strip 40 and shaft hole 30 is blanked, the blanked slug being carried away through opening 141 and chute 140 as by applying a vacuum or reduced pressure therein. Lamina 22 is returned to the plane of strip 40 by push back ring 142 after which strip 40 is advanced to carry lamina 22 to Station No. 6.

At Station No. 6, cylindrical punch 154 is affixed to, and depends from, shoe 70 as by bolts, bolt 156 being shown, and is vertically slidable through an opening in stripper 139. Flanged collar 162 is mounted in die shoe 66 in a race of tapered bearings 158 for rotation about vertical axis 160 and extends through an opening in die retainer 68. A replaceable carbide choke ring 164 is press fitted into the upper end of collar 162 and rotates therewith. Spiral bevel ring gear 166 is affixed to the lower surface of collar 162 as by bolts such as bolt 168 and rotatably drives collar 162 about axis 160. Spiral bevel pinion gear 170 is in driving engagement with gear 166 and in turn is driven by servomotor 172, FIG. 5. Motor 172 is geared such that five motor shaft revolutions equal one revolution of ring 164. On each punching stroke of shoe 70, a lamina 22 is pushed from strip 40 into choke ring 164 which is dimensioned to receive and hold a stack 21 of laminas 22 in a frictional or interference fit, causing each of tabs 34 of the pushed lamina to engage and interlock with the corresponding tab openings and openings 26 of the top lamina 22 in stack 21 to secure the two laminas together in a given relative rotational position. After each downstroke of shoe 70, servomotor 172 turns gear 170 a predetermined rotational distance to impart a rotational movement to collar 162 through ring gear 166. The rotational distance is determined by the skew angle of the axis of slots 38 and on the thickness variations of strip 40, as is explained more fully herein.

The laminas 22 are continually stacked in ring 164 of collar 162, the laminas in collar 162 building the stack 21 until a completed stack 21 forms a rotor core 20. As the top lamina 22 is forcefully inserted onto stack 21, the other laminas are pushed downwardly a distance equal to the thickness of a lamina. When all of the laminas in a stack 21 which forms a core 20 have cleared choke ring 164, the core 20 drops on conveyor belt 176, FIG. 5, which carries the core 20 to another processing area. The core 20 height is determined by the number of laminas 22 in a completed stack 21, which in turn is controlled by the number of laminas formed between two successive bottom laminas which have interlock tab blanks 48 formed therein. As explained, the bottom laminas do not have tabs 34 formed therein and therefore will not interlock with the next lower lamina thus providing separation of successive cores 20.

Figure 5:
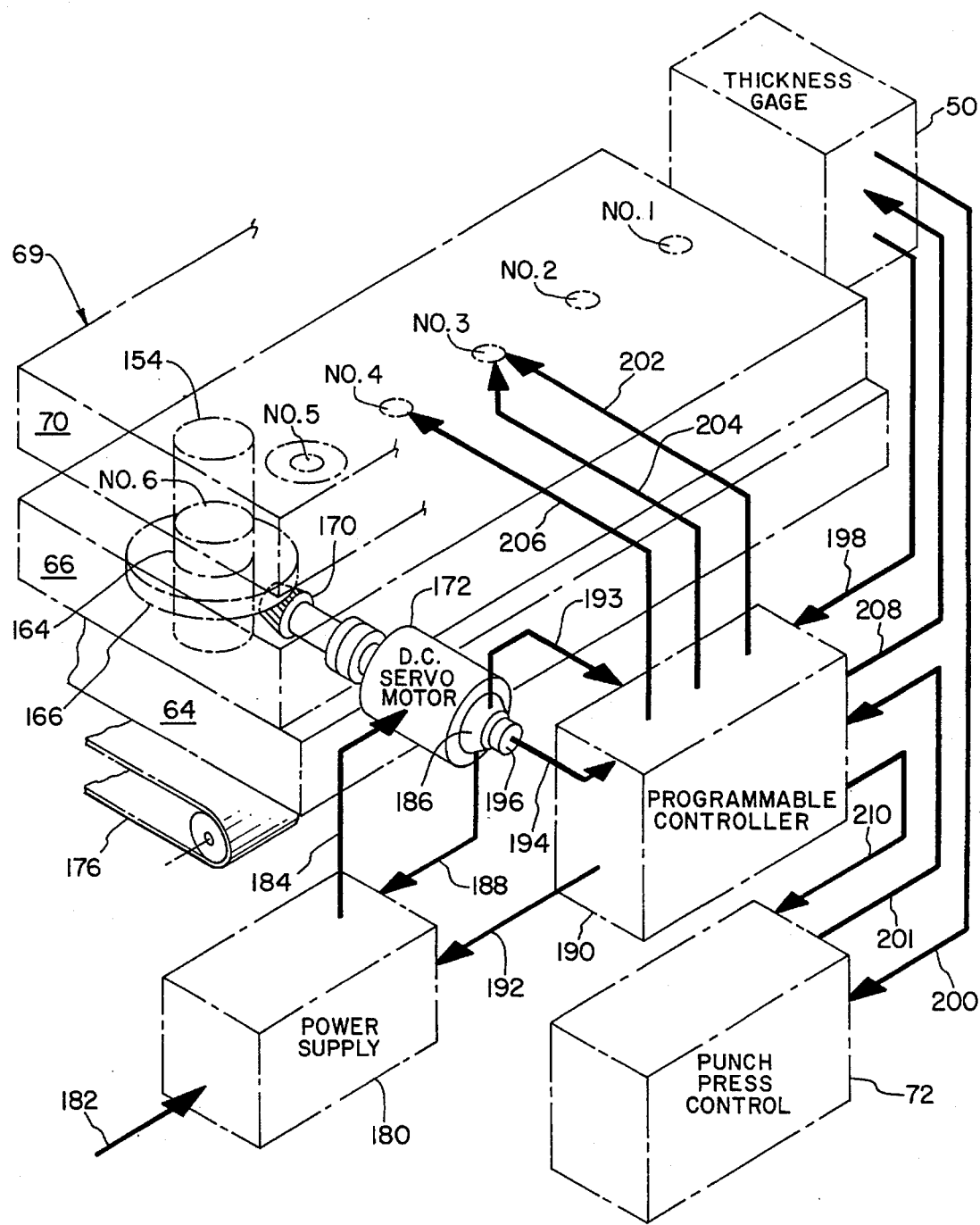
FIG. 5 is a simpified perspective diagrammatic view of the die assembly and control system of this invention.

Referring now to FIG. 5, thickness gauge 50, bolster 64, die shoe 66, and shoe 70 are shown diagrammatically, shoe 70 being only partially shown. Power supply 180 has a three phase 60 Hz input on line 182 from a conventional source, not shown. Power supply 180 is available from Kiowa Corporation, 7685 Corporate Way, Eden Prairie, Minn. 55344, Model No. 8360, bus voltage +120 to +160 VDC, continuous current +/−60 amps, peak current +/−100 amps, or equivalent. Supply 180 provides DC power to DC servomotor 172 through line 184 and receives motor 172 shaft rpm speed information from motor shaft coupled tachometer 186 on line 188 and a control signal from programmable controller 190 on line 192. Controller 190 receives a motor 172 shaft rpm speed signal on line 193 from motor 172 attached to tachometer 186 and motor 172 shaft angular position $\phi_p$ on line 194 from motor 172 shaft coupled to optical encoder 196. Motor 172, tachometer 186, and optical encoder 196 are of the type commercially available from PMI Motors Inc., 5 Aerial Way, Syosset, N.Y. 11791, Catalog No. MC24P, or equivalent. Encoder 196 provides 1000 counts per revolution of motor 172 shaft so that there are 5000 counts from encoder 196 for each revolution of ring 164.

Controller 190 also receives thickness gauge 50 signals from sensors 58, 58A, on line 198, which signals are also supplied to punch press control 72 on line 200. Gauge 50 may be preset to a minimum thickness and a maximum thickness for each of $T_1$ and $T_2$ and when the thickness is outside the minimum-maximum range of either of $T_1$ and $T_2$ a fault signal is sent on line 200 to press control 72 to stop the assembly 42 operation. Controller 190 receives a crank position signal from punch press control 72 on line 201 to provide timing signals $t_a$, $t_b$, described below. Crank position defines the position of shoe 70 In its punching stroke cycle. It is important that assembly 42 be coordinated so that punching stroke of shoe 70 occurs only after all of the solenoid and rotational adjustments have been made. Also, it is preferable that strip 40 thickness readings by gauge 50 be made between punching strokes of shoe 70 to minimize shock and vibrations during measurement.

Controller 190 provides an enable interlock tab blank 48 signal to the solenoid for punch cluster arms 110, 112 at Station No. 3 on line 202, an enable counterbore 49 punch signal to the solenoid for plate 96 at Station No. 3 on line 204, a disable interlock lance and form tabs 34 signal to the solenoid for plate 128 at Station No. 4 on line 206, a timing signal to gauge 50 on line 208, and a stop press signal to punch press control 72 on line 210 for stopping operation of die assembly 42, under certain conditions as described herein.

Prior to die assembly 42 operation, the press operator inputs the following to controller 190:

H, Stack height of core 20;

$A_s$, Skew angle of axes of slots 38 relative axis 32;

Skew direction (+=Clockwise, −=Counterclockwise) of slots 38;

Core 20 O.D. (outside diameter);

Counterbore 33 depth;

$T_N$, Nominal lamina 22 thickness;

$E_p$, Permissible parallelism error in core 20 stack;

Q, minimum number of stack 21 reversals (0, 1, 3, 5).

Note: If the number of laminas 22 that are to be reversed is preset, i.e. not to be automatically determined by the thickness variations sensed by gauge 50, then the operator inputs the desired number of stack reversals per core 20 during stacking that would provide the correction for the parallelism error and therefor it would not be necessary to enter the parallelism error. Also, even if the number of stack reversals are automatically determined, the minimum number of reversals, Q, per core 20, may also be entered.

The dynamic inputs to controller 190 that are automatically input during assembly 42 operation are as follows:

$\phi_p$, the actual angular position of motor 172 shaft;

$T_1$, the thickness of strip 40 at point 40A;

$T_2$, the thickness of strip 40 at point 40B;

$T_1$ minus $T_2$, the differential of thickness of strip 40 at point 40A and the thickness of strip 40 at point 40B;

$t_a$, enable time for reading $T_1$ and $T_2$ on line 198, approximately 10 ms;

$t_b$, enable time for servomotor 172 drive, approximately 100 ms;

$t_c$, enable time for outputs on lines 202, 204, or 206, approximately 50 ms each.

In the operation of controller 190, initial thickness readings $T_1$, $T_2$ are taken on line 198 during a 10 ms window at time $t_a$ when strip 40 is at Station No. 3 for the first lamina in the stack 21 and controller 190 provides an average of thickness readings $T_1$, $T_2$ which is compared to the operator entered input nominal stack height H to determine the approximate number N of laminas per core stack. This approximate number N is used to determine the number of lamina 22 deposited on stack 21 before each reversal when the operator enters inputs for the minimum number of required reversals Q and to determine the incremental rotations required to provide the operator input for skew angle $A_s$. In addition, four arithmetic running totals are started. Two totals are based on an average strip 40 thickness reading, and of these two, a first total is not delayed and a second total Is delayed by three assembly 42 punch strokes of shoe 70 to reflect accumulated stack 21 height or thickness at Station No. 6. A running total is also started for each of sensors 58, 58A in thickness gauge 50, one sensor at each of strip 40 edges 40A, 40B, and these totals are also delayed by three counts or strokes of assembly 42.

The enabling of the interlock removal punch cluster at Station No. 3 on line 202 occurs only on first or bottom lamina stroke in each core 20 stack. The interlock lance and tab 34 form cluster, Station No. 4, is disabled by a signal on line 206 only on the assembly 42 stroke when the first lamina, or bottom lamina, is at Station No. 4. The enabling of the counterbore 33 punch 88 is based on the above mentioned first total (undelayed average lamina thickness running total). Punch 88 is enabled on the first assembly 42 stroke for a new stack 21 and remains enabled until such first arithmetic total is greater than the nominal counterbore depth entered by the operator. Punch 88 is then disabled until the assembly 42 stroke for the next first lamina in a stack 21. Of course, if no counterbore thickness is entered by the operator, then punch 88 will always be disabled.

The rotation of die ring 164 in Station No. 6 is determined by: (1) operator inputs for (a) skew angle $A_s$ (b) rotor O.D., (c) stack height H, (d) skew direction, and when entered by the operator, (e) minimum number of stack 21 reversals, (f) parallelism error $E_p$, and (2) Dynamic inputs for (a) accumulated differential between "front" edge 40A and "back" edge 40B thickness accumulations, a reversal or half turn of ring 164 occurring when accumulated thickness differential exceeds a factor or the permissible entered parallelism error $E_p$; a new dtfferential thickness accumulation starts at each reversal of ring 164, and (b) sequential lamina 22 number "n" in a core 20 stack. The sequential number n of laminas 22 in the stack 21 is used to determine a die ring 164 reversal when a minimum number of stack reversals Q is entered so that the reversals occur at predetermined intervals in the stack 21 as will be explained and described more fully.

Controller 190 determines core stack 21 reversals as follows:

When the operator enters a number of stack 21 reversals (Q):

| CONDITION | | H |
|---|---|---|
| | n < (N/2Q – ½) | 0 |
| (N/2Q + ½) | < n < (N/2Q + ½) | 2500 |
| (N/2Q + ½) | < n < (1.5N/2Q – ½) | 0 |
| (1.5N/2Q – ½) | < n < (1.5N/2Q + ½) | 2500 |
| (1.5N/2Q + ½) | < n < (2.5N/2Q – ½) | 0 |
| (2.5N/2Q – ½) | < n < (2.5N/2Q + ½) | 2500 |
| (2.5N/2Q + ½) | < n < (3.5N/2Q – ½) | 0 |
| (3.5N/2Q – ½) | < n < (3.5N/2Q + ½) | 2500 |
| (3.5N/2Q + ½) | < n < (4.5N/2Q – ½) | 0 |
| (4.5N/2Q – ½) | < n < (4.5N/2Q + ½) | 2500 |
| (4.5N/2Q + ½) | < n | 0 |

Where:

H=counts of encoder 196 (Motor 172 is geared so that five shaft revolutions=one revolution of ring 164 and encoder 196 counts 1000 counts per shaft revolution so that there are 5000 counts of encoder 196 for each revolution of ring 164);

$N=H/T_N$=nominal total number of laminas in a core 20 stack;

Q=number of operator entered minimum stack 21 reversals;

n=the particular lamina number in a core 20 stack where n=1 for the first lamina and n=N for the last lamina.

When operation is automatic (no operator entered Q):

| CONDITION | H |
|---|---|
| $\Sigma T_1 - \Sigma T_2 > +/- E_p/2$ | 2500 |
| $\Sigma T_1 - \Sigma T_2 > +/- E_p/2$ | 0 |

Where:

$T_1$=Thickness measurement of strip 40 at edge 40A.
$T_2$=Thickness measurement of strip 40 at edge 40B.
$E_p$=Operator entered parallelism error.

In operation of controller 190 to determine the desired ring 164 angular position, $\phi$, before interlocking the next lamina 22 on stack 21, the accumulated rotational increments of ring 164 to obtain the desired skew angle of slots 38 is added to H or half turn rotation that was determined i the manner immediately preceding. Thus, $$\phi = 5000 B_S(S/H) + H$$

Where:

$\phi$=in counts of encoder 196;

$B_S$=a skew factor determined by controller 190 from the operator entered skew angle $A_s$ and is equal to the peripheral inches of skew between the top and bottom of a single slot 38 in a core 20/ (core 20 O.D.×pi); also, $B_S$=skew angle of a slot 38 axis/360°;

S=accumulated height of stack 21 in collar 162.

H=core 20 stack height.

H=counts of encoder 196 relating to state of half revolution of ring 164 as determined above.

$\phi$ is compared with $\phi_p$, received by controller 190 on line 194, and if there is an error differential, an error signal is provided on line 192 to power supply 180 which provides a correction voltage on line 184 to motor 172 to servo the error differential to zero, advancing or retarding the rotational position of ring 164 through the gearing.

Controller 190 determines the last lamina 22 in a core 20 stack by using binary signals, 0, 1, for L, which is the last lamina logic symbol:

L=0 when $S<H-T_{N/2}$
L=1 when $S>H-T_{N/2}$

S, H, and $T_N$ are defined as before. If $T_N$ is not entered by the operator, then controller 190 uses $T_N=(T_1+T_2)/2$, $T_1$ and $T_2$ being defined as before.

When L=1, controller 190 resets S, N, and $n_s$, S and N being defined as before and $n_s$=short count, a count that is made by controller 190 for timing signal $t_c$ and is equal to n, defined as before. $n_s$ is disabled when $n_s>2$. When $n_s=1$, an enable signal for punch cluster to remove blanks 48 is provided on line 202 to the solenoid for arms 110, 112 for approximately 60 ms and when $n_s=2$, a disable signal for punch cluster to lance and form tabs 34 is provided to the solenoid for plate 128 for approximately 60 ms.

When $(C_D-S)>T_{N/2}$, an enable signal for counterbore punch 88 is provided on line 204 to the solenoid for positioning plate 96. $C_D$ is the entered counterbore 33 depth and S and $T_N$ are defined as before.

A signal for disabling punch assembly 42 is provided on line 210 to control 72 when:

N/2Q<16

N and Q being defined as before.

Also, when either $T_1$ or $T_2$ is outside a preset minimum-maximum range a fault signal on line 200 is sent to punch press control 72, assembly 42 is stopped since strip 40 is too far out of thickness variation tolerance to be used.

Programmable controller 190 is commercially available from Kiowa Corporation, address as above, and is designated Profiler II Motion Controller (modified) and includes:

(1) No. MIC 8201 Motor control module.
(1) No. MIC 8210 Digital positioning module.
(1) No. MIC 8100 Digital I/O module.
(1) No. MIC 2124 Optically isolated I/O card with 24 I/O modules and DC power supply.
(1) No. MIC 8408 Analog input module.
(1) No. MIC 2832 Alphanumeric display.
(3) No. TW-8 Thumbwheel programmers.
(1) No. REM-2 Remote programming panel.
(1) EXP-2 Dual Port I/O expansion module.

Custom software for programmable controller 190 is also commercially available from Kiowa Corporation, address as above, for operation of controller 190 in the manner described above, and from other sources.

Figure 7:
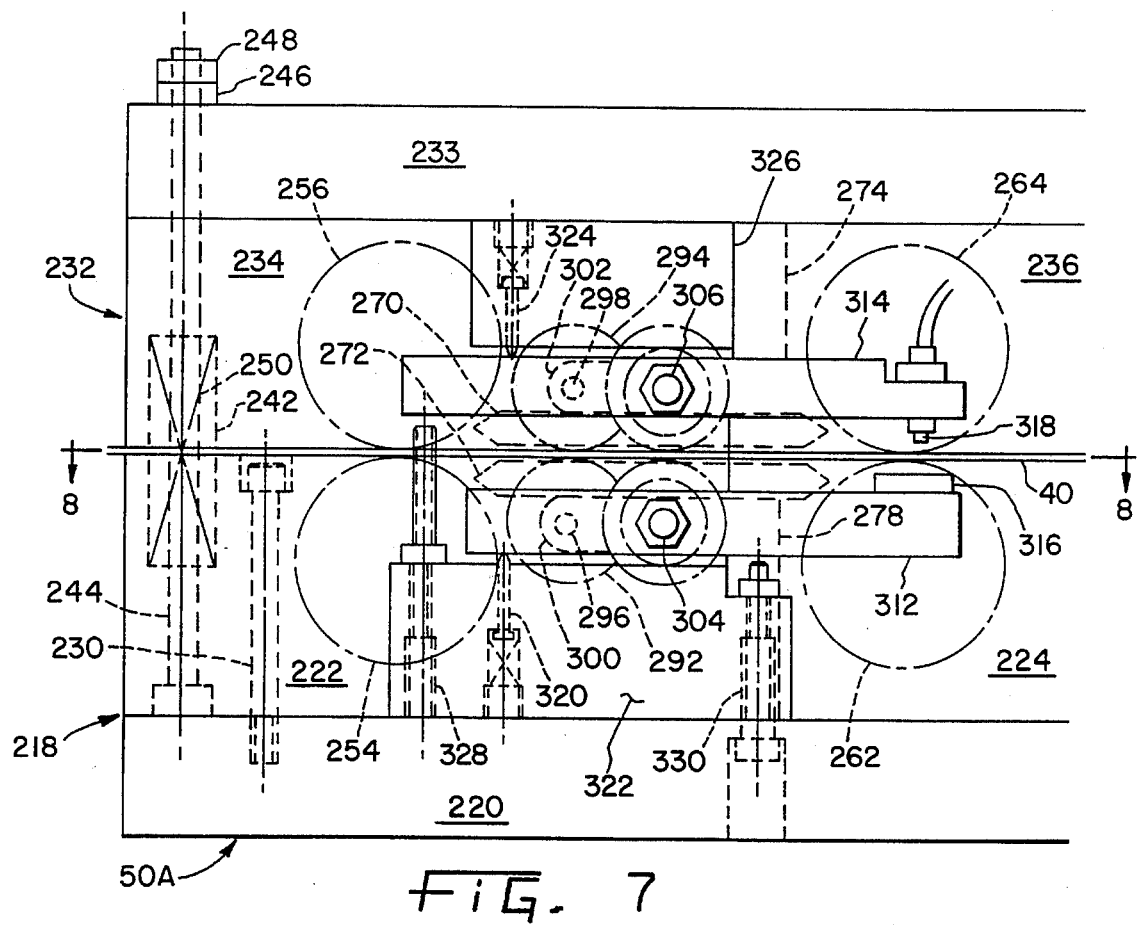
FIG. 7 is a partial, broken elevational view of a second thickness gauge embodiment for use with the press of FIG. 4.
Figure 8:
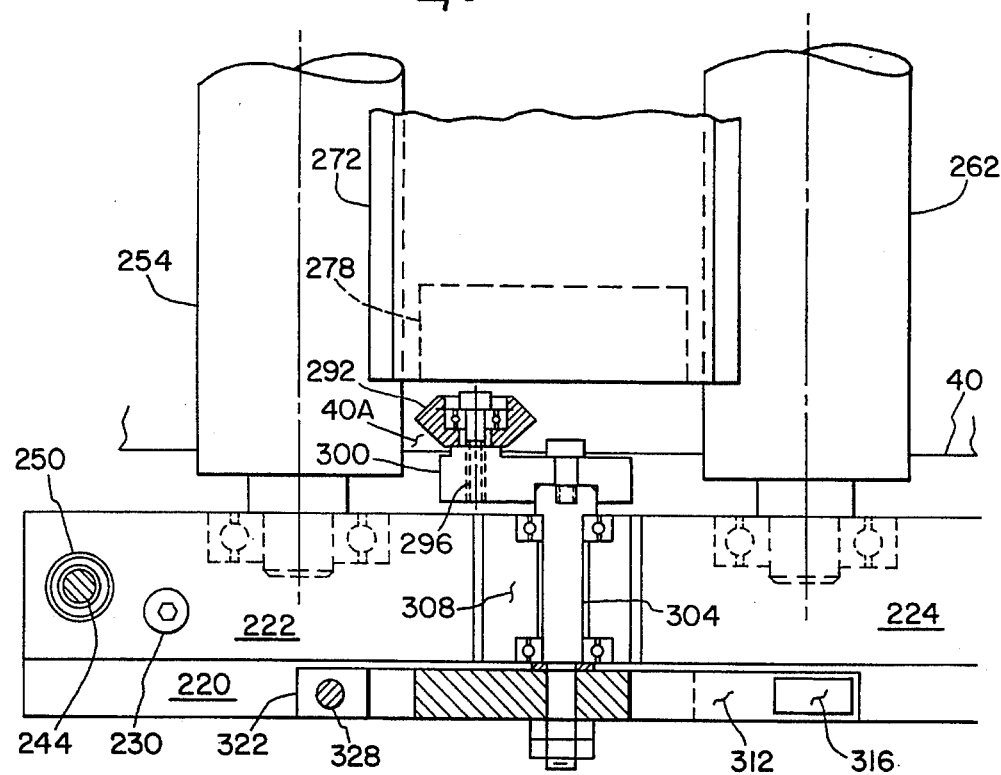
FIG. 8 is a partial view of a section taken at 8—8 of FIG. 7.

Referring to FIGS. 7 and 8, gauge 50A is shown and which may be mounted relative assembly 42 in the approximate position of gauge 50, FIG. 3, or may be mounted outboard of assembly 42 in a cleaner environment and for easier calibration. Lower housing 218 has lower base 220 to which is secured horizontally spaced upstanding lower mounting arms, arms 222, 224 being shown, by a plurality of bolts, bolt 230 shown. Upper housing 232 has upper base 233 to which is secured horizontally spaced depending upper mounting arms, arms 234, 236 being shown, by a plurality of bolts, not shown. Housings 218, 232 are resiliently coupled by a plurality of bolt-spring combinations, combination 242 shown. Elongated bolt 244 has its head fitted in a shouldered opening in arm 222 and extends vertically upwardly through openings in corresponding lower and upper mounting arms 222, 234, respectively, and extends above base 233 where its threaded end is fastened to nuts 246, 248. Compression spring 250 is fitted in facing shouldered openings in arms 222, 234, placing arms 222, 234 under a separating spring pressure. Since bolt-spring combinations similar to combination 242 in construction and mounting are placed in similar manner in each pair of corresponding lower and upper mounting arms, the arms in each pair are resiliently urged apart a distance that is adjustable by adjustably positioning nuts 246, 248 of each bolt-spring combination longitudinally on their respective bolts, urging housings 218, 232 resiliently apart.

Vertically spaced elongated damping rollers 254, 256 each has its opposite axle ends rotatable in trunnioned mountings in respective mounting arms, the mounting of one axle end of roller 254 in arm 222 being shown, FIG. 8. In like manner, each of vertically spaced elongated damping rollers 262, 264 has its opposite axle ends rotatable in trunnioned mountings in respective mounting arms, the mounting of one axle end of roller 262 in arm 224 being shown. Rollers 254, 256, 262, 264 each is preferably of a resilient material and nylon covered. Elongated strip 40 passes between and is dampened by rollers 262, 264 and rollers 254, 256 which are in adjustably resilient contact with strip 40 by adjusting the spacing between housings 218, 232 as previously explained.

Damping plates 270, 272 are positioned above and below strip 40 respectively, plate 270 secured below base 233 by transversely spaced vertical arms, arm 274 being shown, and plate 272 secured above base 220 by transversely spaced vertical arms, arm 278 being shown. Each of plates 270, 272 has opposite cross feed edges that are tapered, one edge of each plate extending between and spaced from rollers 254, 256 and the opposite edge of each plate extending between and spaced from rollers 262, 264. Each of plates 270, 272 has a vertical clearance of between 0.005–0.010 inches with its respective strip 40 surface to dampen strip 40 flutter and thus limit the movement and vibration of the thickness gauge rollers next described.

Gauge 50A has vertically spaced carbide rollers 292, 294 similar to rollers 51, 52, FIGS. 3, 3A, rotatable on precision ball bearings about horizontal, transverse axles 296, 298, respectively, above and below strip 40, respectively. Rollers 292, 294 contact the upper and lower surfaces respectively of strip 40 at edge 40A. Axles 296, 298 are affixed to one end of roller arms 300, 302, respectively, arms 300, 302 fixed to pivot pins 304, 306 respectively. Pins 304, 306 are rotatable on precision ball bearings in upstanding post 308 fixedly supported on base 220 between arms 222, 224. Fixed to the outboard ends of pine 304, 306 are elongated gauge arms 312, 314 respectively, arms 312, 314 being replaceable for purposes later described. Opposed ends of arms 312, 314 carry aluminum target plate 316, similar to target plate 57, and sensor 318, similar to sensor 58, respectively. Spring loaded pin 320 is slidably mounted in upstanding block 322 which is fixedly mounted to base 220 to bias arm 312 in a clockwise direction about pin 304 and spring loaded pin 324 is slidably mounted in block 326, which is supported in fixed relation to block 322, biasing arm 314 in a counterclockwise direction about pivot pin 306 to maintain contact between rollers 292, 294 and their respective surfaces of strip 40. Bolts 328, 330 fixedly support block 322 to base 220 and have upwardly extending ends that act as rotational stops for arms 314, 312 respectively. The distance between axis 296 and pin 304 is a fraction, e.g. one third, of the distance between pin 304 and target plate 316 and the distance between axle 298 and pin 306 is a fraction, e.g. one third, of the distance between pin 306 and sensor 318 in order to magnify the movement between rollers 292, 294 which is imparted by and a measure of the thickness of strip 40 at edge 40A and increase sensitivity of the measurement. Arms 312, 314 may be replaced with arms having a greater distance between pins 304, 306 and plate 316, sensor 318 respectively for greater sensitivity as is understood by those skilled in the art. In similar manner, carbide rollers and associated sensor and target plate, not shown, are mounted on the opposite cross-feed side 40B of strip 40 to measure the strip 40 thickness at edge 40B and operate to provide in conjunction with sensor 318 outputs the thickness measurement as described for sensors 58, 58A.

Modifications of this invention will be apparent to those skilled in the art. If supply strip 40 has a certain differential cross feed thickness and experience shows that this differential exists over substantially the entire strip from a given supply coil, then only one or a relatively small number of thickness differentials need be read at gauge 50 and controller 190 can be set to determine the number Q of stack 21 reversals per core 20 fabricated from that coil. Q, the minimum stack 21 reversals per core 20 may be entered concurrently with selection of the automatic reversal determination mode of this invention to insure a minimum number of stack reversals per core 20. Also, rotations of stack 21 other than 180° may be made to accomplish the objectives of the invention, e.g. rotations of 90° to 270° could be used. The rotations of stack 21 could be in increasing steps for successive stack rotations, e.g. 45° for the first rotation, 90° for the second rotation, 135° for the third rotation, and so forth, adding 45° rotation to each successive rotation. To correct for a parallelism error $E_p$, at least one accumulated reversal of stack 21 would be made. The thickness measurements $T_1$, $T_2$ may be made at other points in the manufacturing process as long as they are timely made for determination of the reversals of stack 21 during stacking of the laminas and can be made of the lamina itself after being blanked from strip 40. Further, this invention can be used to advantage in the manufacture of other laminated parts than those described herein. In like manner, other of the above described parameters may be varied to suit a particular set of conditions for use of this invention.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A controller for providing control signals to a progressive die assembly, the progressive die assembly including advancing means for advancing sheet stock material, punching means for forming laminas from the sheet stock material, and rotating means for rotating at least one lamina prior to stacking and interlocking said at least one lamina with another lamina to thereby form a stack of laminas, the improvement comprising:

selection means for selecting an arc through which to rotate said at least one lamina relative to a said another lamina prior to stacking and interlocking said at least one lamina; and angular rotation means for providing electrical control signals to the said rotating means to enable the said rotating means to rotate said at least one lamina relative to said another lamina through said selected arc prior to stacking and interlocking said at least one lamina to thereby compensate for lamina thickness variations.

2. The controller of claim 1 wherein said angular rotation means provides control signals for rotating said at least one lamina within an arcuate range of approximately 30° to 330°.

3. The controller of claim 1 wherein said angular rotation means provides control signals for rotating said at least one lamina approximately 180°.

4. The controller of claim 1 for a progressive die assembly having a rotating means capable of incremental rotation wherein said controller includes increment means for determining the amount of incremental rotation of the said rotating means, and said angular rotation means provides control signals which are based on the amount of incremental rotation determined by said increment means.

5. The controller of claim 1 for a progressive die assembly which includes an inserting means for pushing the laminas into said rotating means and thereby stacking and interlocking said laminas and a sensor monitoring the said inserting means, said controller further including punch sensing means for receiving signals from the said sensor for monitoring the said inserting means to determine the operative state of the said inserting means, and timing means for coordinating operation of the said inserting means and the said rotating means, said timing means coupled to the said punch sensing means and said angular rotation means to thereby prevent said angular rotation means from providing control signals for the rotation of the said rotating means during the stacking and interlocking operation of the said inserting means.

6. The controller of claim 1 wherein said angular rotation means further provides electrical control signals to cause said rotating means to further rotate said laminas through a skew angle.

7. The controller of claim 1 wherein said punching means includes a solenoid, said controller further comprising means for activating said solenoid.

8. The controller of claim 7 wherein said punching means includes a counterbore solenoid and wherein said solenoid activating means selectively activates said counterbore solenoid for controlling the punching of a counterbore in the laminas.

9. The controller of claim 7 wherein said punching means includes an interlock solenoid and wherein said solenoid activating means selectively activates said interlock solenoid for controlling the formation of interlock tabs in the laminas.

10. The controller of claim 1 wherein said selection means further comprises means for selecting individual laminas for relative rotation.

11. The controller of claim 1 wherein said selected arc is comprised of first and second component arcs and wherein said first component arc compensates for lamina thickness variations and said second component arc provides a skew angle.

12. The controller of claim 1 wherein said controller further comprises feedback receiving means for receiving a feedback signal from said rotating means.

13. A controller for providing control signals to a progressive die assembly, the progressive die assembly including advancing means for advancing sheet stock material, punching means for forming laminas from the sheet stock material, and rotating means for rotating at least one lamina prior to stacking and interlocking said at least one lamina with another lamina to thereby form a stack of laminas, the improvement comprising:

angular rotation means for providing control signals to the said rotating means to enable the said rotating means to rotate at least one lamina relative to a said another lamina prior to stacking and interlocking said at least one lamina to thereby compensate for lamina thickness variations; and means for operator entry of the number of laminas to be rotated, wherein said angular rotation means provides control signals for rotating said laminas according to the number of laminas to be rotated entered by the operator.

14. A controller for providing control signals to a progressive die assembly including a gauge for measuring the thickness of sheet stock material, advancing means for advancing the sheet stock material, punching means for forming laminas from the sheet stock material, and rotating means for rotating at least one lamina prior to stacking and interlocking said at least one lamina with another lamina to thereby form a stack of laminas, the improvement comprising:

angular rotation means for providing control signals to the said rotating means to enable the said rotating means to rotate at least one lamina relative to a said another lamina prior to stacking and interlocking said at least one lamina to thereby compensate for lamina thickness variations; and means for receiving signals from the said gauge, and wherein said angular rotation means provides control signals for automatically rotating said laminas in response to measured thickness of the sheet stock material.

15. A controller for a progressive die assembly which includes advancing means for advancing sheet stock material, punching means for forming laminas from the sheet stock material, rotating means for rotating at least one lamina prior to stacking and interlocking said at least one lamina with another lamina to thereby form a stack of laminas, a gauge for measuring the thickness of the sheet stock material, means for forming bottom laminas to thereby separate lamina stacks, and means for operator entry of nominal stack height, the improvement comprising:

angular rotation means for providing control signals to the said rotating means to enable the said rotating means to rotate at least one lamina relative to a said another lamina prior to stacking and interlocking said at least one lamina to thereby compensate for lamina thickness variations;

means for calculating an average thickness of said sheet stock material based on the thickness measured by the said gauge; and means for comparing the calculated average thickness to the nominal stack height entered by the operator to determine the number of laminas for each stack and for activating said bottom lamina forming means when the nominal stack height is achieved.

16. A controller for providing control signals to a progressive die assembly, the progressive die assembly including advancing means for advancing sheet stock material, punching means for forming laminas from the sheet stock material, and rotating means for rotating at least one lamina prior to stacking and interlocking said at least one lamina with another lamina to thereby form a stack of laminas, the improvement comprising:

angular rotation means for providing control signals to the said rotating means to enable the said rotating means to rotate at least one lamina relative to a said another lamina prior to stacking and interlocking said at least one lamina to thereby compensate for lamina thickness variations, said angular rotation means further providing control signals to the said rotating means to rotate said laminas through a skew angle; and means for operator entry of said skew angle.

17. A controller for providing control signals to a progressive die assembly, the progressive die assembly including advancing means for advancing sheet stock material, punching means for forming laminas from the sheet stock material, and rotating means for rotating at least one lamina prior to stacking and interlocking said at least one lamina with another lamina to thereby form a stack of laminas, the improvement comprising:

angular rotation means for providing control signals to the said rotating means to enable the said rotating means to rotate at least one lamina relative to a said another lamina prior to stacking and interlocking said at least one lamina to thereby compensate for lamina thickness variations; and means for operator entry of the number of laminas desired to be rotated in order to compensate for thickness variations, and wherein said angular rotation means determines whether to provide control signals to the said rotating means in order to rotate a particular lamina according to the following table:

| CONDITION | | Result |
|---|---|---|
| | $n < (N/2Q - \frac{1}{2})$ | no rotation |
| $(N/2Q - \frac{1}{2})$ | $< n < (N/2Q + \frac{1}{2})$ | rotation |
| $(N/2Q + \frac{1}{2})$ | $< n < (1.5N/2Q - \frac{1}{2})$ | no rotation |
| $(1.5N/2Q - \frac{1}{2})$ | $< n < (1.5N/2Q + \frac{1}{2})$ | rotation |
| $(1.5N/2Q + \frac{1}{2})$ | $< n < (2.5N/2Q - \frac{1}{2})$ | no rotation |
| $(2.5N/2Q - \frac{1}{2})$ | $< n < (2.5N/2Q + \frac{1}{2})$ | rotation |
| $(2.5N/2Q + \frac{1}{2})$ | $< n < (3.5N/2Q - \frac{1}{2})$ | no rotation |
| $(3.5N/2Q - \frac{1}{2})$ | $< n < (3.5N/2Q + \frac{1}{2})$ | rotation |
| $(3.5N/2Q + \frac{1}{2})$ | $< n < (4.5N/2Q - \frac{1}{2})$ | no rotation |
| $(4.5N/2Q - \frac{1}{2})$ | $< n < (4.5N/2Q + \frac{1}{2})$ | rotation |
| $(4.5N/2Q + \frac{1}{2})$ | $< n$ | no rotation | where:

N is the nominal total number of laminas in a stack;

Q is the minimum number of rotations entered by the operator; and n is the particular lamina number in a stack where n=1 for the first lamina and n=N for the last lamina.

18. The controller of claim 17 wherein said angular rotation means determines a desired angular position for the said rotating means, said angular rotation means providing the control signals based on the desired angular position which is determined according to the equation:

$$\phi = k * B_S * (S/H) + \Theta$$

where:

$\phi$ is the desired angular position of the said rotating means;

k is a constant related to the amount of movement needed for one complete rotation of the said rotating means;

$B_S$ is the skew factor;

S is the current accumulated height of stack;

H is the stack height; and $\Theta$ is a variable having a value which depends on the amount of rotation desired for thickness variation compensation.

19. A controller for providing control signals to a progressive die assembly which includes advancing means for advancing sheet stock material, punching means for forming laminas from the sheet stock material, rotating means for rotating at least one lamina prior to stacking and interlocking said at least one lamina with another lamina to thereby form a stack of laminas, and a gauge for measuring the thickness of the sheet stock material at two locations, the improvement comprising:

angular rotation means for providing control signals to the said rotating means to enable the said rotating means to rotate at least one lamina relative to a said another lamina prior to stacking and interlocking said at least one lamina to thereby compensate for lamina thickness variations; and means for operator entry of a maximum allowable parallelism error, and wherein said angular rotation means determines whether to provide control signals to the said rotating means in order to rotate a particular lamina according to the following table:

| CONDITION | Result |
|---|---|
| $\Sigma T_1 - \Sigma T_2 > +/- E_p/2$ | rotation |
| $\Sigma T_1 - \Sigma T_2 \leq +/- E_p/2$ | no rotation | where:

$T_1$ is the thickness measurement of the sheet stock material at a first edge of the sheet stock material;

$T_2$ is the thickness measurement of the sheet stock material at a second edge of the sheet stock material; and $E_p$ is the parallelism error entered by the operator.

20. A controller for providing control signals to a progressive die assembly, the progressive die assembly including advancing means for advancing sheet stock material, punching means including a counterbore solenoid for forming laminas from the sheet stock material, and rotating means for rotating at least one lamina prior to stacking and interlocking said at least one lamina with another lamina to thereby form a stack of laminas, the improvement comprising:

angular rotation means for providing control signals to the said rotating means to enable the said rotating means to rotate at least one lamina relative to a said another lamina prior to stacking and interlocking said at least one lamina to thereby compensate for lamina thickness variations; and means for selectively activating said counterbore solenoid for controlling the punching of a counterbore in the laminas wherein said activating means activates the counterbore solenoid according to the equation:

$$(C_D - S) > T_N/2$$

where:

$C_D$ is the counterbore depth,

S is the accumulated stack height, and $T_N$ is the nominal lamina thickness.

21. A controller for providing control signals to a progressive die assembly, the progressive die assembly including advancing means for advancing sheet stock material, punching means including an interlock solenoid for forming laminas from the sheet stock material, and rotating means for rotating at least one lamina prior to stacking and interlocking said at least one lamina with another lamina to thereby form a stack of laminas, the improvement comprising:

angular rotation means for providing control signals to the said rotating means to enable the said rotating means to rotate at least one lamina relative to a said another lamina prior to stacking and interlocking said at least one lamina to thereby compensate for lamina thickness variations; and means for selectively activating said interlock solenoid for controlling the formation of interlock tabs in the laminas wherein said activating means activates the interlock solenoid to completely blank out the interlock tabs according to the equation:

$S > H - T_N/2$ where

S is the accumulated stack height,

H is the desired stack height, and $T_N$ is the nominal lamina thickness.

22. A controller for providing control signals to a progressive die assembly, the progressive die assembly including advancing means for advancing sheet stock material, punching means for forming laminas from the sheet stock material, and a servomotor for rotating at least one lamina prior to stacking and interlocking said at least one lamina with another lamina to thereby form a stack of laminas, the improvement comprising:

selection means for selecting an arc through which to rotate said at least one lamina relative to a said another lamina prior to stacking and interlocking said at least one lamina;

angular rotation means coupled to said selection means for providing electrical control signals to the said rotating means to enable the said rotating means to rotate said at least one lamina relative to said another lamina through said selected arc prior to stacking and interlocking said at least one lamina to thereby compensate for lamina thickness variations; and feedback receiving means for receiving a feedback signal from said servomotor.

* * * * *

UNITED STATES PATENT AND TRADEMARK OFFICE
CERTIFICATE OF CORRECTION

PATENT NO. : 5,604,678
DATED : February 18, 1997
INVENTOR(S) : Thomas R. Neuenschwander It is certified that error appears in the above-indentified patent and that said Letters Patent is hereby corrected as shown below:

IN THE CLAIMS

Claim 20, column 18, line 64, change "eguation" to --equation--.

In the Title and in Col. 1, line 3, change "LIMITED" to --LAMINATED--.

Signed and Sealed this

Thirtieth Day of September, 1997

Attest:

BRUCE LEHMAN

*Attesting Officer*       *Commissioner of Patents and Trademarks*